US006847507B2

(12) United States Patent
Wang et al.

(10) Patent No.: US 6,847,507 B2
(45) Date of Patent: Jan. 25, 2005

(54) CONSTRUCTION METHOD AND DESIGN FOR A MAGNETIC HEAD ACTUATOR MECHANISM

(75) Inventors: Jeffery L. Wang, Tai Po (HK); Chi Hung Yuen, Kowloon (HK); Liu Jun Zhang, Dongguan (CN); Ji Yang, Dongguan (CN); Yiu Sing Ho, Shatin (HK)

(73) Assignee: SAE Magnetics (H.K.) Ltd., Kwai Chung (HK)

( * ) Notice: Subject to any disclaimer, the term of this patent is extended or adjusted under 35 U.S.C. 154(b) by 70 days.

(21) Appl. No.: 10/355,473

(22) Filed: Jan. 31, 2003

(65) Prior Publication Data

US 2004/0042124 A1 Mar. 4, 2004

(30) Foreign Application Priority Data

Sep. 4, 2002 (CN) ................................ PCT/CN02/00618

(51) Int. Cl.[7] ................................................ G11B 5/55
(52) U.S. Cl. ................................ 360/266.1; 360/265.8; 360/244.5
(58) Field of Search ........................... 360/266.1, 265.8, 360/244.5, 264.8, 264.9; 29/603.03, 603.04

(56) References Cited

U.S. PATENT DOCUMENTS

| 4,490,635 | A | | 12/1984 | Harrison et al. ............... 310/38 |
| 5,631,789 | A | | 5/1997 | Dion et al. .................. 360/106 |
| 5,691,581 | A | * | 11/1997 | Umehara et al. ......... 360/265.8 |
| 5,914,836 | A | | 6/1999 | Pottebaum ................... 360/105 |
| 6,087,620 | A | * | 7/2000 | Brooks et al. ............ 29/603.03 |
| 6,347,023 | B1 | * | 2/2002 | Suwa ....................... 360/264.8 |
| 6,577,474 | B2 | * | 6/2003 | Kazmierczak et al. ... 360/264.9 |
| 6,654,208 | B2 | * | 11/2003 | Hong et al. .............. 360/265.9 |

FOREIGN PATENT DOCUMENTS

JP 6-84302 2/1993

* cited by examiner

Primary Examiner—Robert S. Tupper
(74) Attorney, Agent, or Firm—Kenyon & Kenyon (57) ABSTRACT

A head actuator mechanism and a method of manufacture for that mechanism are disclosed. The head actuator mechanism includes a head gimbal assembly coupled to the top support face of a bearing assembly and an actuator driving mechanism coupled to the opposite support face. The head gimbal assembly includes an actuator arm and a load beam, the actuator arm being mounted to the top support face. The actuator driving assembly includes a driving coil and a coil holder frame. The driving coil is positioned in a magnetic field created by a magnetic block and yoke.

13 Claims, 8 Drawing Sheets

CONSTRUCTION METHOD AND DESIGN FOR A MAGNETIC HEAD ACTUATOR MECHANISM

BACKGROUND INFORMATION

The present invention relates to magnetic hard disk drives. More specifically, the present invention relates to a method of assembling head actuator mechanisms.

Figure 1:
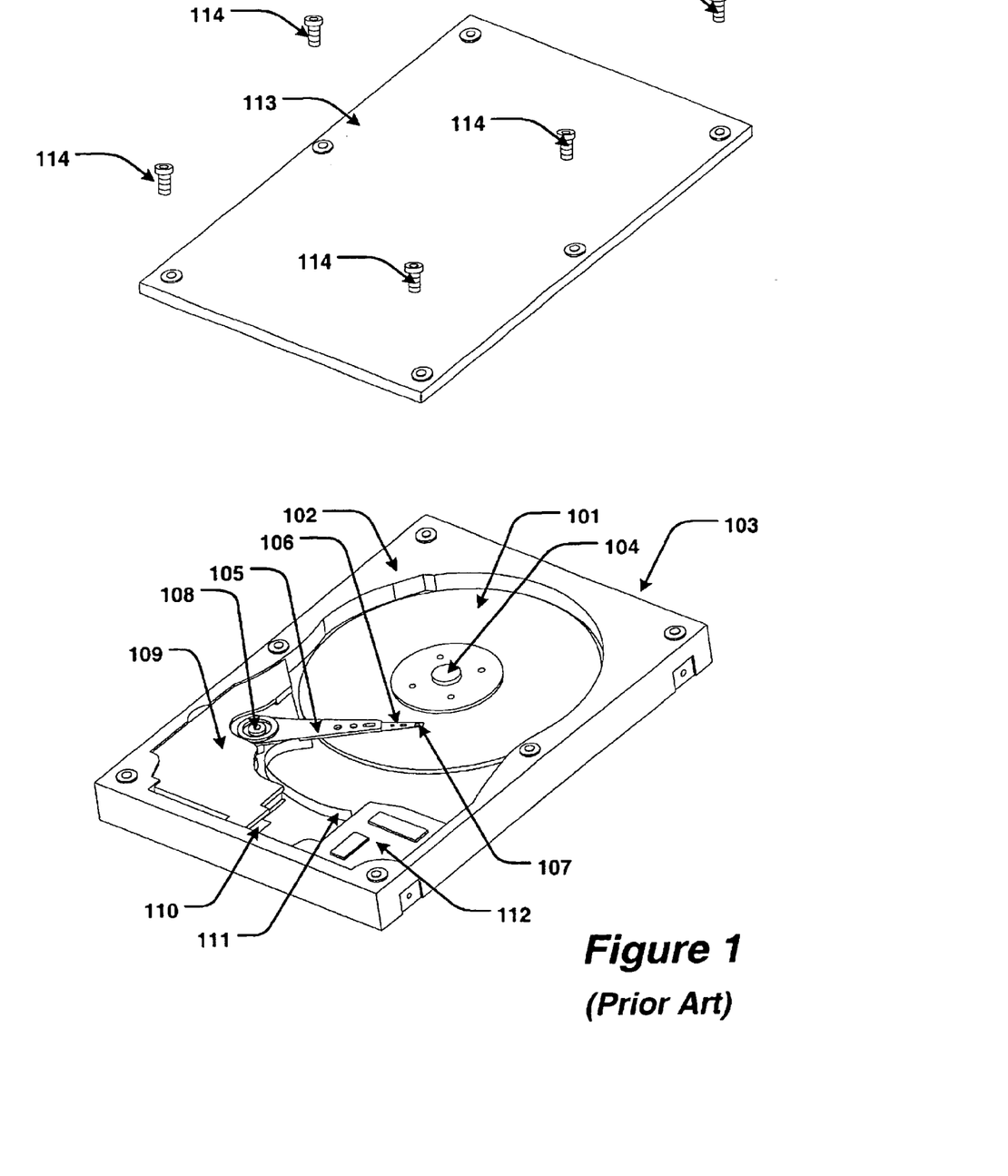
FIG. 1 provides an illustration of a typical disk drive.

In the art today, different methods are utilized to improve recording density of hard disk drives. FIG. 1 provides an illustration of a typical disk drive. The typical disk drive has a head gimbal assembly (HGA) configured to read from and write to a magnetic hard disk 101. The HGA and the magnetic hard disk 101 are mounted to the base 102 of a main board 103. The disk 101 is rotated relative to the base 102 by a spindle motor 104. The HGA typically includes an actuator arm 105 and a load beam 106. The HGA supports and positions a magnetic read/write slider 107 above the magnetic hard disk 101. The HGA is rotated relative to the base 102 along the axis of a bearing assembly 108. The HGA is rotated by a magnetic field generated between a yoke 109 and a magnetic block 110. A relay flexible printed circuit 111 connects a board unit 112 to the magnetic read/write slider 107. A cover 113 protects the hard drive components as they operate. Often, the cover is attached by a set of screws 114.

Figure 2:
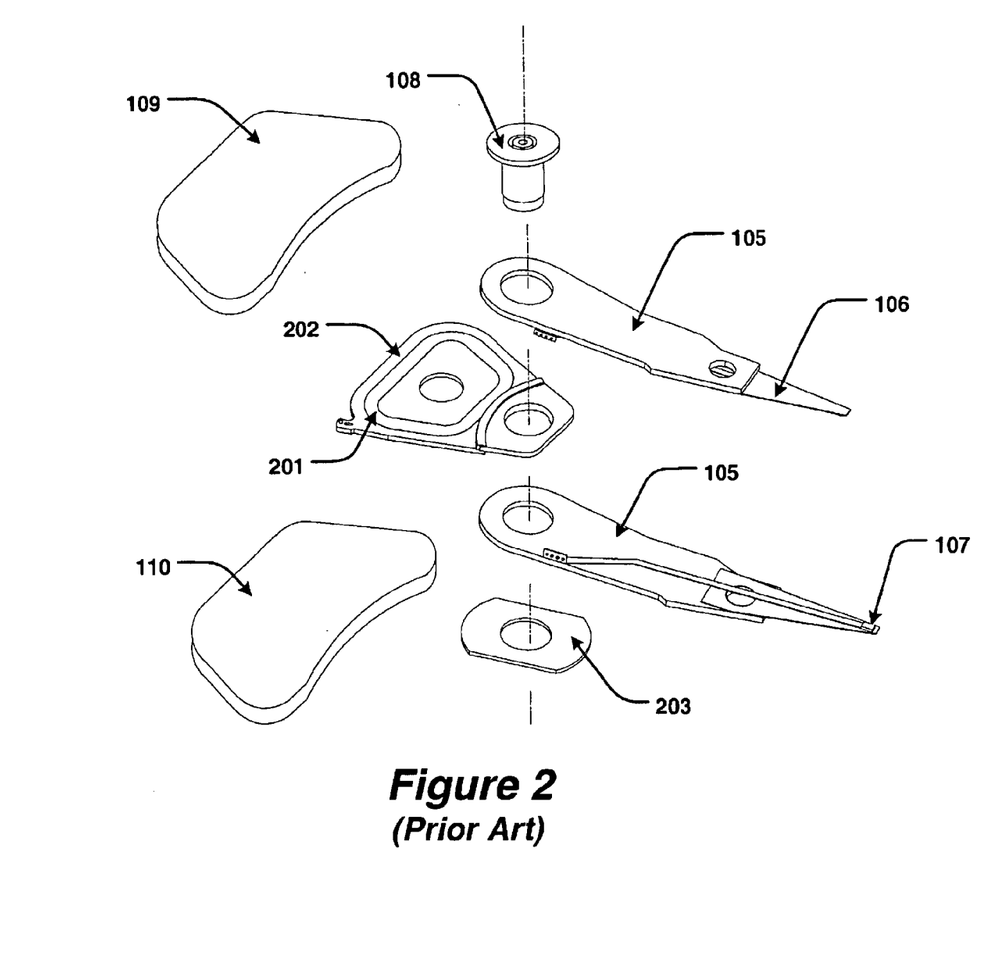
FIG. 2 provides an illustration of a head actuator mechanism as configured in the prior art.

FIG. 2 provides an illustration of a head actuator mechanism as configured in the prior art. The HGA, in this embodiment including an actuator arm 105 and a loadbeam 106, are coupled to an actuator driving mechanism. In one embodiment, more than one HGA are coupled to the actuator driving mechanism. The actuator driving mechanism can include a driving coil 201 attached to a coil holding frame 202. The magnetic field generated by the yoke 109 and magnetic block 110 acts upon the driving coil 201 causing the coil holding frame 202, and by extension the HGA, to move. The HGA and actuator driving mechanism pivot around the bearing assembly 108. A spacer 203 separates each HGA and actuator driving mechanism from the other HGA's and driving mechanisms on the bearing assembly 108.

Figure 3:
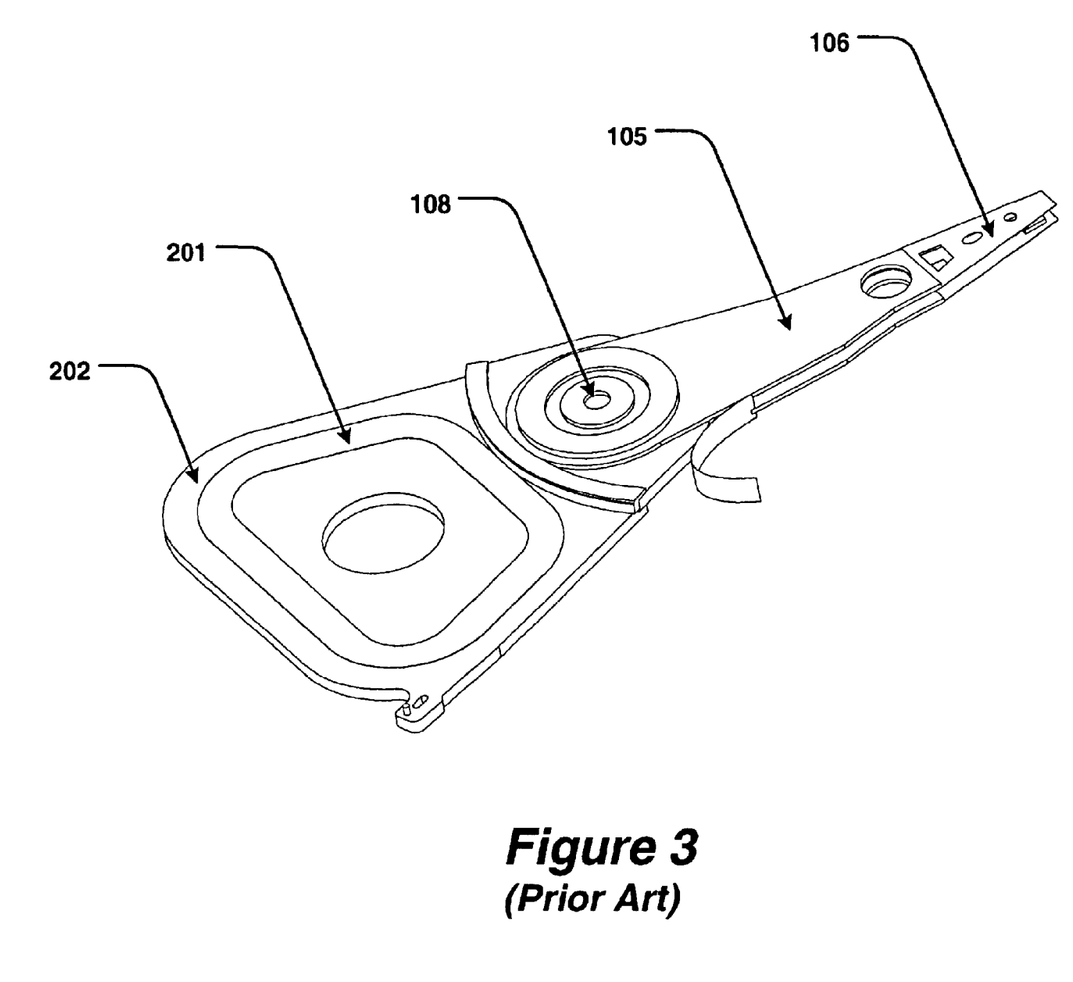
FIG. 3 provides an illustration of the assembled head actuator mechanism.

FIG. 3 provides an illustration of the assembled head actuator mechanism. The loadbeam 107 is coupled to actuator arm 108 to form the HGA. The driving coil 201 is coupled to the coil holding frame 202 to form the actuator driving mechanism. The HGA is bonded to the actuator driving mechanism. The entire head actuator mechanism pivots on the bearing assembly.

Creating a single head actuator mechanism often results in damage to the head actuator mechanism during assembly. The driving coil becomes distorted, causing the head actuator mechanism not to move efficiently or correctly. Further, the closeness of the drive coil to the HGA can distort the positioning of the magnetic read/write head. A method is needed for manufacturing the head actuator mechanism without potentially causing damage to the drive coil.

DETAILED DESCRIPTION

A head actuator mechanism and a method of manufacture for that mechanism are disclosed. In one embodiment, the head actuator mechanism includes a head gimbal assembly coupled to the top support face of a bearing assembly and an actuator driving mechanism coupled to the opposite support face. In a further embodiment, the head gimbal assembly includes an actuator arm and a load beam, the actuator arm being mounted to the top support face. In a further embodiment, the actuator driving assembly includes a driving coil and a coil holder frame. The driving coil is positioned in a magnetic field created by a magnetic block and yoke. By separating the actuator driving mechanism from the head gimbal assembly, the driving coil is protected from damage that could be caused during assembly. Further, the assembly process is simplified.

Figure 4:
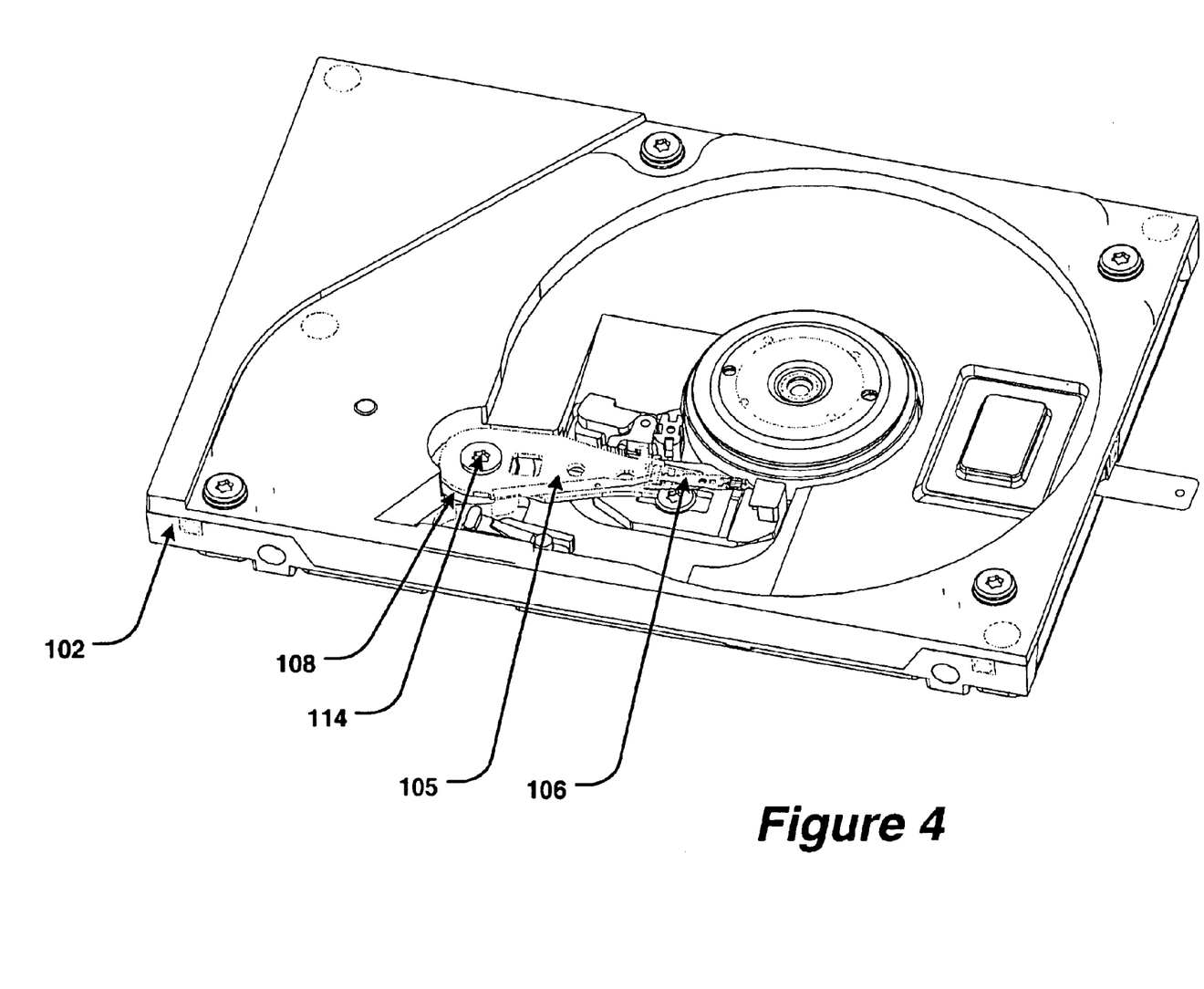
FIG. 4 illustrates one embodiment of a top view of a hard disk drive as constructed in the present invention.

FIG. 4 illustrates one embodiment of a top view of a hard disk drive as constructed in the present invention. In one embodiment, the HGA includes a load beam 106 and an actuator arm 105. The head gimbal assembly (HGA) is mounted on the base 102 by coupling the actuator arm 105 to a top surface of the bearing assembly 108. In one embodiment, the HGA is mounted to the top surface of a bearing assembly using a screw 114.

Figure 5:
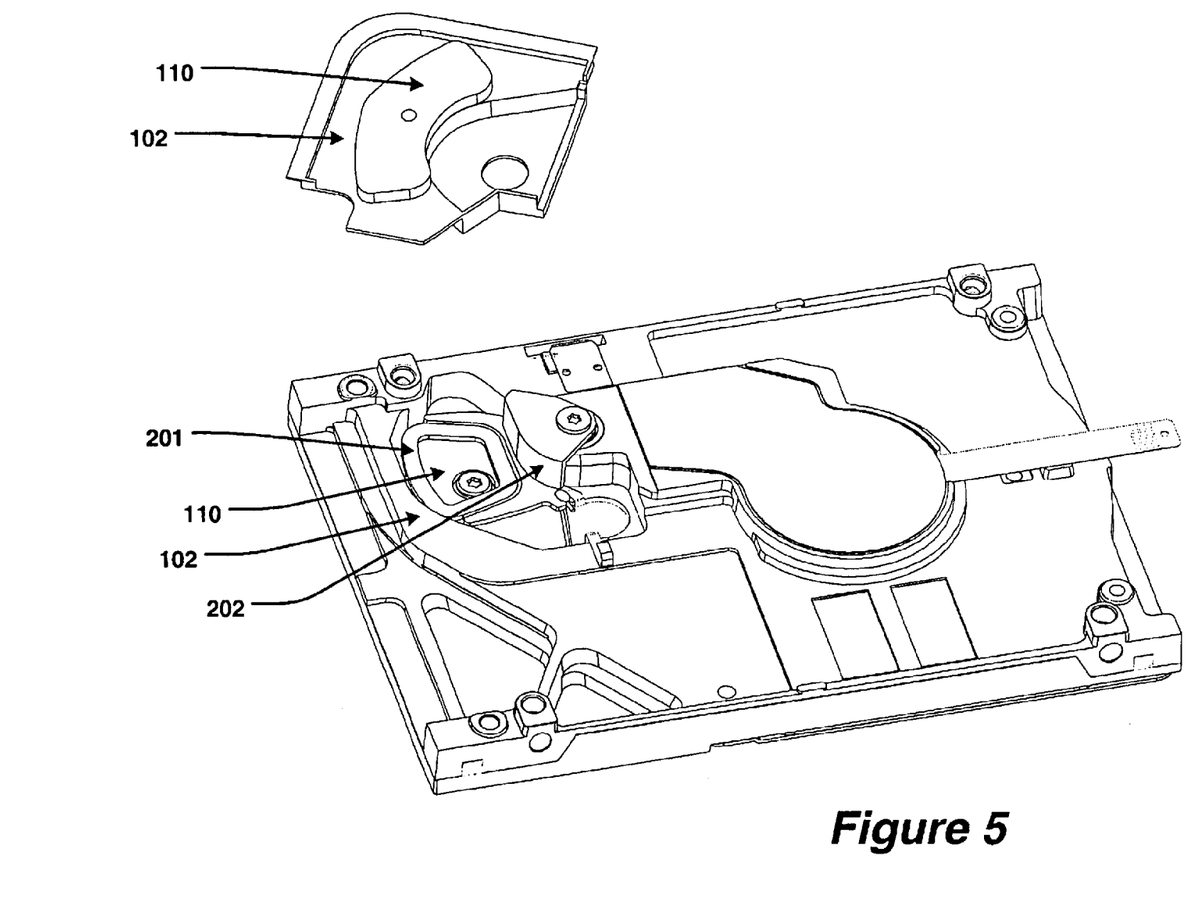
FIG. 5 illustrates one embodiment of the actuator driving mechanism mounted on the underside of the base.

FIG. 5 illustrates one embodiment of the actuator driving mechanism mounted on the underside of the base 102. In one embodiment, the actuator driving mechanism includes a driving coil 201 and a coil holding frame 202. While the driving coil 201 is positioned underneath a yoke 109, a magnetic block 110 is positioned in the base 102 underneath the driving coil 201.

Figures 6A, 6B:
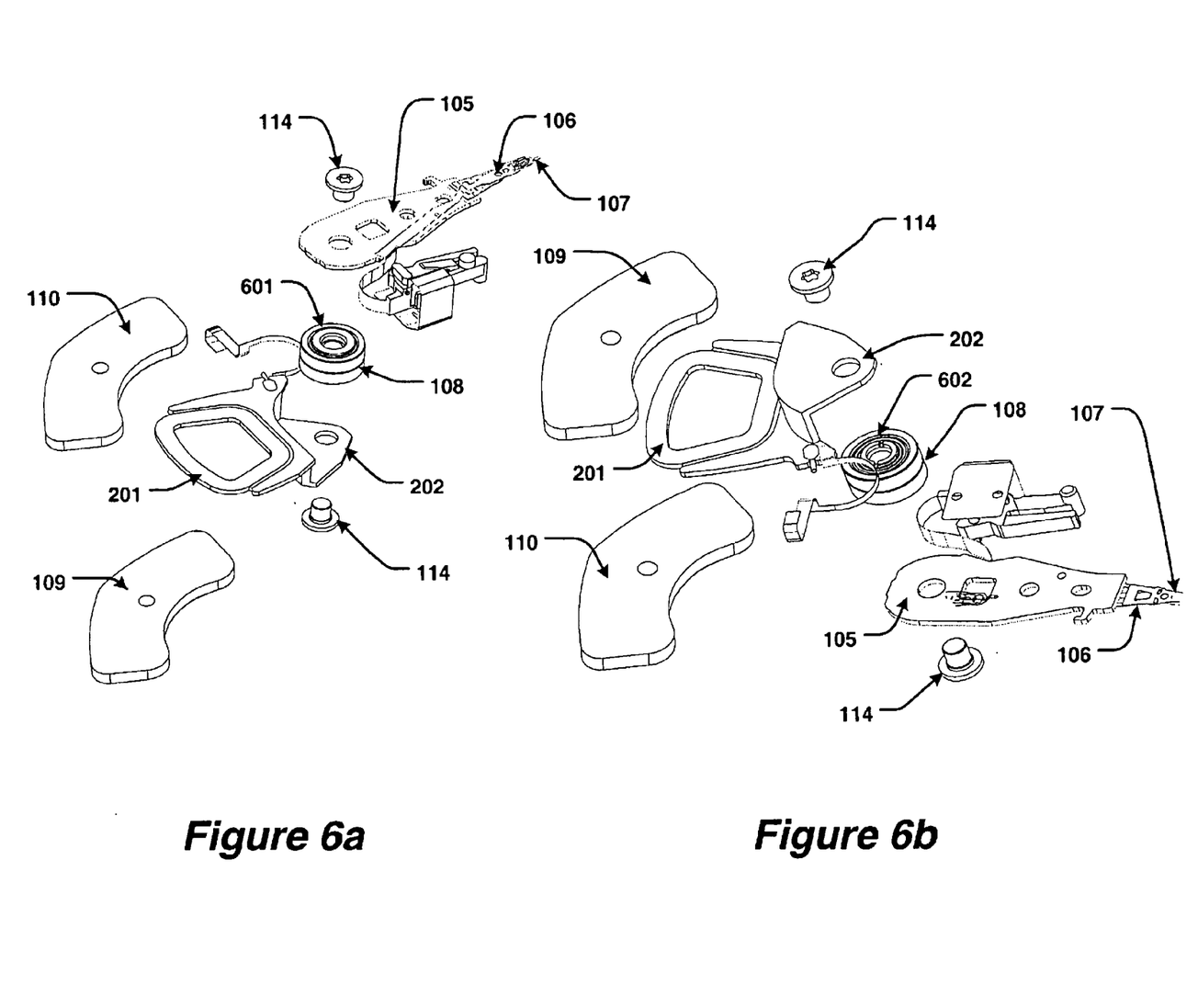
FIGS. 6a–b illustrate the assembly of the head actuator mechanism.

FIGS. 6a–b illustrate the assembly of the head actuator mechanism. FIG. 6a illustrates a top view of the assembly. The HGA is mounted to the support face 601 of the bearing assembly 108. In one embodiment, the HGA includes a loadbeam 106 coupled to an actuator arm 105. In one embodiment, the loadbeam 106 is coupled to the actuator arm 105 by laser welding. In a further embodiment, the actuator arm 105 is mounted to the top support face 601 using a screw 114. FIG. 6b illustrates a bottom view of the assembly. The actuator driving mechanism is mounted to the opposite support face 602 from the HGA. In one embodiment, the actuator driving mechanism includes a driving coil 201 coupled to a coil holding frame 202. In a further embodiment, the coil holding frame 202 is mounted to the opposite support face 602 using a screw 114. In one embodiment, the HGA and the actuator driving are assembled separately before being mounted to the bearing assembly 108.

Figure 7A:
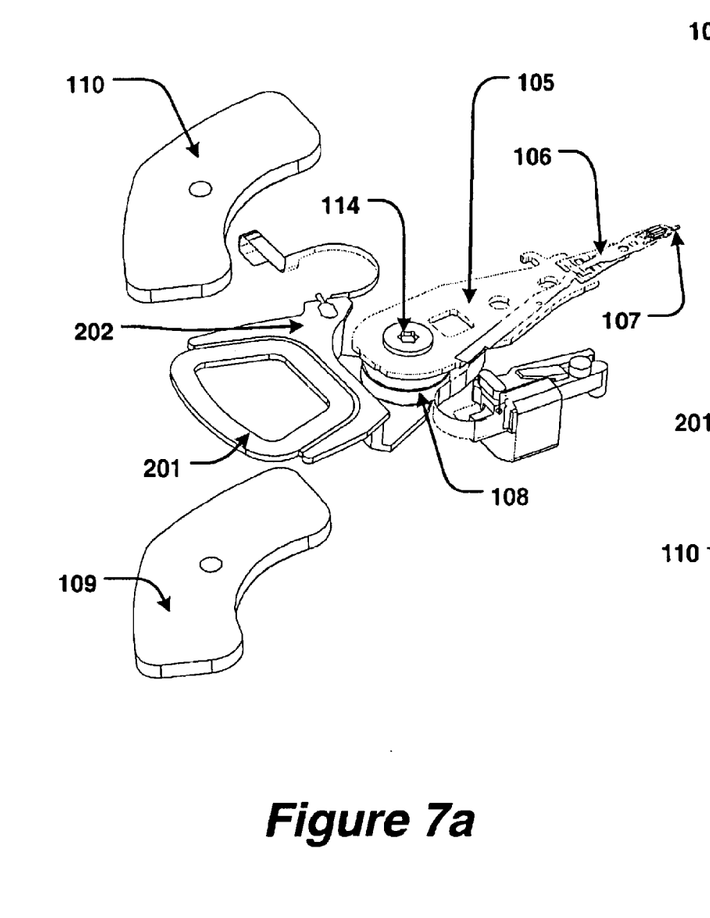
FIGS. 7a–b illustrate one embodiment of the assembled head actuator mechanism.
Figure 7B:
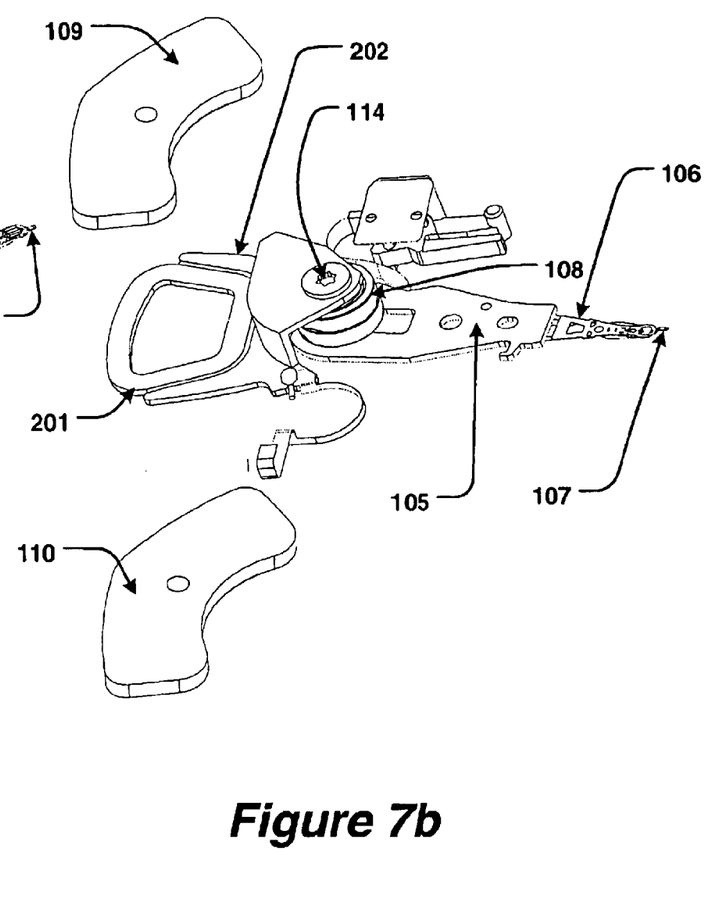

FIGS. 7a–b illustrate one embodiment of the assembled head actuator mechanism. FIG. 7a illustrates the top view and FIG. 7b illustrates the bottom view. The driving coil 201 of the actuator driving mechanism is positioned between the yoke 109 and magnetic block 110. In one embodiment, the coil holding frame 202 is shaped to position the driving coil 201 on a plane with the head gimbal assembly. The yoke 109 and the magnetic block 110 generate a magnetic field that acts upon the electric field created by the current running through the driving coil 201. The driving coil 201 is moved by the magnetic field, causing the coil holding frame 202 to be moved. The coil holding frame 201 pivots along the axis of the bearing assembly 108. The torque generated on the bearing assembly 108 by the movement of the coil holding frame 202 is passed to the HGA, causing the HGA to pivot in the same tangential direction. The HGA moves the magnetic read/write slider 107 in a radial direction on the magnetic storage disk 101.

Figures 8A, 8B:
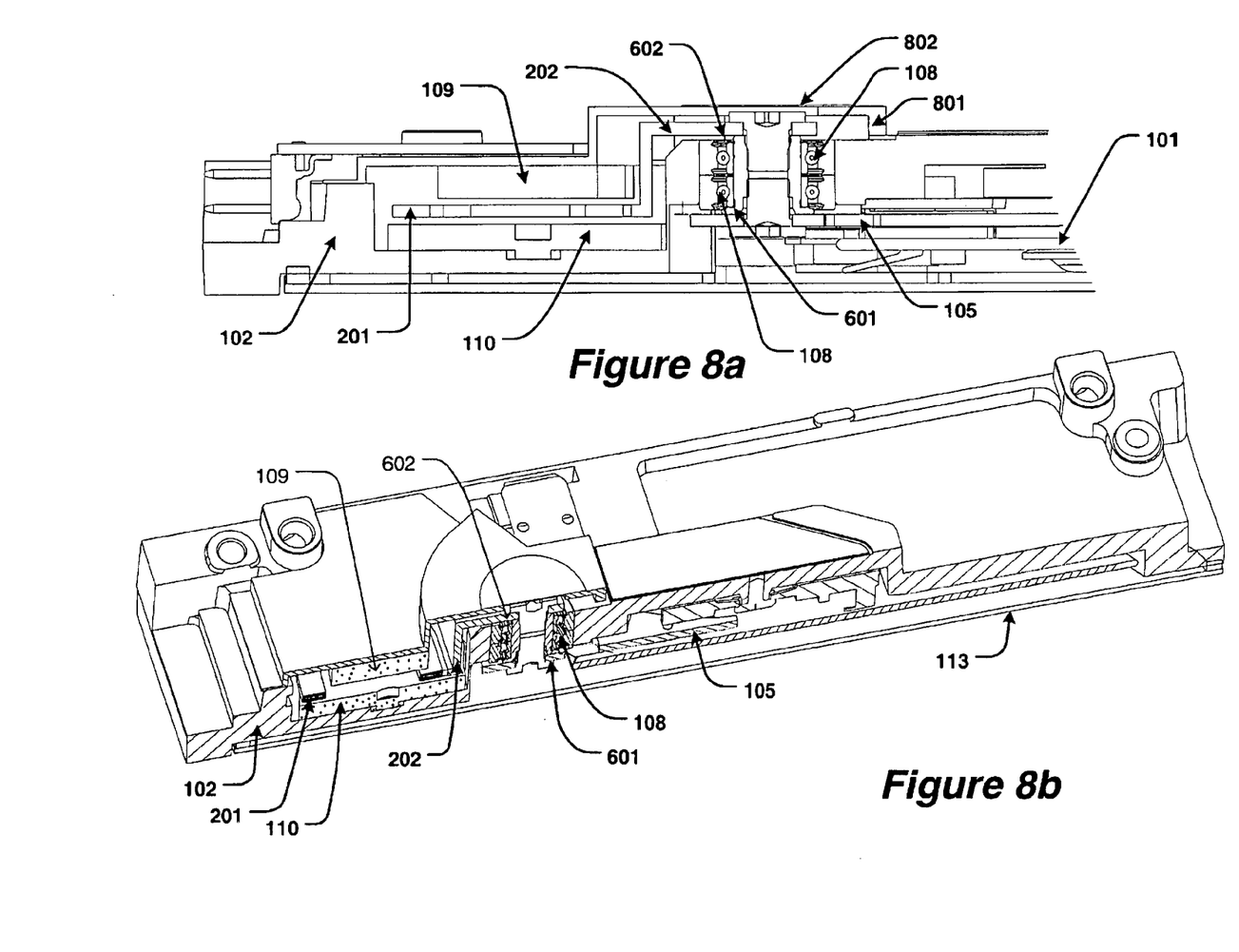
FIGS. 8a–b illustrate one embodiment of a cross section of the hard disk drive.

FIG. 8*a* illustrates in a planar view one embodiment of a cross section of the hard disk drive. FIG. 8*b* illustrates the same cross section in a perspective view. The driving coil 201 is positioned between the yoke 109 and the magnetic block 110. In one embodiment, the magnetic block 110 is attached to the base 102 and the yoke 109 is attached to a cover of the coil motor 801. The HGA is mounted to the top support face 601 of the bearing assembly 108. The actuator driving mechanism is mounted to the opposite support face 602 of the bearing assembly 108. In one embodiment, a coil motor cover seal layer 802 protects the actuator driving mechanism mounting.

Although several embodiments are specifically illustrated and described herein, it will be appreciated that modifications and variations of the present invention are covered by the above teachings and within the purview of the appended claims without departing from the spirit and intended scope of the invention.

What is claimed is:

1. A head actuator mechanism, comprising:

a pivot assembly to facilitate rotation around an axis;

a head gimbal assembly coupled to a top support face of the assembly; and an actuator driving mechanism to rotate the head gimbal assembly around the axis coupled to an opposite support face of the pivot assembly.

2. The head actuator mechanism of claim 1, wherein the head gimbal assembly includes:

a load beam to support a magnetic read/write slider head; and an actuator arm to couple the load beam to the pivot assembly.

3. The head actuator mechanism of claim 2, wherein the load beam is coupled to the actuator arm by laser welding.

4. The head actuator mechanism of claim 1, wherein the actuator driving mechanism includes:

a driving coil to be acted upon by an electromagnetic field; and a holding frame to couple the driving coil to the pivot assembly.

5. The head actuator mechanism of claim 4, wherein the holding frame is shaped to position the driving coil on a plane with the head gimbal assembly.

6. The head actuator mechanism of claim 1, wherein the actuator driving mechanism and the head gimbal assembly are assembled as separate individual components.

7. A system, comprising:

a base to support the system;

a disk containing data;

a spindle motor coupled to the base to rotate the disk relative to the base;

a pivot assembly to facilitate rotation around an axis;

a head gimbal assembly coupled to a top support face of the pivot assembly;

an actuator driving mechanism to rotate the head gimbal assembly around the axis coupled to an opposite support face of the pivot assembly; and a magnetic read/write head to read the data from the disk.

8. The system of claim 7, wherein the head gimbal assembly includes:

a load beam coupled to the magnetic read/write slider head; and an actuator arm to couple the load beam to the pivot assembly.

9. The system of claim 8, wherein the load beam is coupled to the actuator arm by laser welding.

10. The system of claim 7, wherein the actuator driving mechanism includes:

a driving coil to be acted upon by an electromagnetic field; and a holding frame to couple the driving coil to the pivot assembly.

11. The system of claim 10, wherein the holding frame is shaped to position the driving coil on a plane with the head gimbal assembly.

12. The system of claim 10, further comprising:

a magnetic block coupled to the base beneath the driving coil;

a cover coupled to the base; and a yoke attached to the cover above the driving coil.

13. The system of claim 7, wherein the actuator driving mechanism and the head gimbal assembly are assembled as separate individual components.

\* \* \* \* \*